(12) United States Patent
Kim et al.

(10) Patent No.: US 12,359,844 B2
(45) Date of Patent: Jul. 15, 2025

(54) OUTDOOR UNIT OF AIR CONDITIONER

(71) Applicant: SAMSUNG ELECTRONICS CO., LTD., Suwon-si (KR)

(72) Inventors: Seungoh Kim, Suwon-si (KR); Jihye Lee, Suwon-si (KR); Yongbin Lim, Suwon-si (KR); Changsoo Lim, Suwon-si (KR); Hyeonu Park, Suwon-si (KR); Jihoon Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 113 days.

(21) Appl. No.: 18/101,397

(22) Filed: Jan. 25, 2023

(65) Prior Publication Data

US 2023/0168004 A1 Jun. 1, 2023

Related U.S. Application Data

(63) Continuation of application No. PCT/KR2021/009370, filed on Jul. 21, 2021.

(30) Foreign Application Priority Data

Aug. 10, 2020 (KR) ........................ 10-2020-0099857

(51) Int. Cl.
*F24F 13/32* (2006.01)
*F24F 1/56* (2011.01)

(52) U.S. Cl.
CPC ............... *F24F 13/32* (2013.01); *F24F 1/56* (2013.01)

(58) Field of Classification Search
CPC . F16B 12/02; F16B 12/30; F24F 13/32; F24F 1/16; F24F 1/50; F24F 1/56; F24F 1/60; F24F 1/46
See application file for complete search history.

(56) References Cited

U.S. PATENT DOCUMENTS 8,092,156 B2 1/2012 Jang et al.
8,297,071 B2 10/2012 Shioyama et al.
(Continued)

FOREIGN PATENT DOCUMENTS

JP 2000-249369 9/2000
JP 2000-329377 11/2000
(Continued)

OTHER PUBLICATIONS

8101397_2024-09-17_JP_2017053578_A_ (Year: 2017).*
(Continued)

*Primary Examiner* — Frantz F Jules
*Assistant Examiner* — Martha Tadesse
(74) *Attorney, Agent, or Firm* — STAAS & HALSEY LLP

(57) ABSTRACT

An outdoor unit of an air conditioner, including a cabinet including a base panel and a side panel; a compressor supported by the cabinet; a heat exchanger supported by the cabinet; and a leg frame at a lower end of the cabinet to support the cabinet. The leg frame includes: a channel including an upper flange coupled to the base panel, a lower flange installable on an installation surface, and a web connecting the upper flange with the lower flange. A first coupling portion and a second coupling portion are configured to fix one side portion of the channel to the side panel, and are positioned on opposite sides with the channel interposed therebetween.

15 Claims, 13 Drawing Sheets

(56) References Cited

U.S. PATENT DOCUMENTS

| | | | |
|---|---|---|---|
| 9,541,323 B2 | 1/2017 | Kagawa et al. | |
| 10,359,211 B2 | 7/2019 | Mori et al. | |
| 11,118,796 B2 | 9/2021 | Koike et al. | |
| 11,149,968 B2 * | 10/2021 | Koike | F24F 1/12 |
| 11,428,421 B2 | 8/2022 | Hirawa et al. | |
| 2009/0114376 A1 * | 5/2009 | Ishida | F24F 1/50 165/104.31 |
| 2016/0187006 A1 * | 6/2016 | Koo | F24F 1/22 62/508 |
| 2016/0195343 A1 * | 7/2016 | Jeung | F16M 13/02 29/897.3 |
| 2019/0338964 A1 | 11/2019 | Koike et al. | |

FOREIGN PATENT DOCUMENTS

| | | |
|---|---|---|
| JP | 2002-89888 | 3/2002 |
| JP | 3602308 | 12/2004 |
| JP | 2008-309430 | 12/2008 |
| JP | 4894299 | 3/2012 |
| JP | 4900709 | 3/2012 |
| JP | 2012083012 A * | 4/2012 |
| JP | 2017-53578 | 3/2017 |
| JP | 2017053578 A * | 3/2017 |
| JP | 6115551 | 4/2017 |
| JP | 6277523 | 2/2018 |
| JP | 6288147 | 3/2018 |
| JP | 6531795 | 6/2019 |
| JP | 6543539 | 7/2019 |
| JP | 2019-132544 | 8/2019 |
| KR | 10-0157240 | 3/1999 |
| KR | 10-2009-0044502 | 5/2009 |
| KR | 10-2014-0088625 | 7/2014 |
| WO | WO 2011/007541 A1 | 1/2011 |

OTHER PUBLICATIONS

18101397_2024-09-18_KR_0157240_B1_M (Year: 1999).*
18101397_2024-09-19_JP_2012083012_A_M (Year: 2012).*
International Search Report, PCT/ISA/210, dated Nov. 4, 2021, in PCT Application No. PCT/KR2021/009370.
Written Opinion, PCT/ISA/237, dated Nov. 4, 2021, in PCT Application No. PCT/KR2021/009370.
Office Action dated Dec. 13, 2024 issued in Korean Application No. 10-2020-0099857.

* cited by examiner

OUTDOOR UNIT OF AIR CONDITIONER

CROSS-REFERENCE TO RELATED APPLICATIONS

This application is a continuation of International Application PCT/KR2021/009370, filed Jul. 21, 2021, and claims foreign priority to Korean Application 10-2020-0099857, filed Aug. 10, 2020, the disclosures of which are incorporated herein by reference in their entireties.

BACKGROUND

1. Field

The present disclosure relates to an outdoor unit of an air conditioner, and more particularly, to an outdoor unit of an air conditioner having an aseismatic structure.

2. Description of Related Art

In general, an air conditioner is an apparatus for adjusting temperature, humidity, air current, etc. to appropriate conditions for human activities using a cooling cycle. Main components constituting the cooling cycle include a compressor, a condenser, an evaporator, and a blow fan.

Air conditioners are classified into a split type air conditioner in which an indoor unit is separated from an outdoor unit, and a window type air conditioner in which an indoor unit and an outdoor unit are installed together in a single cabinet.

The cabinet of the outdoor unit of the split type air conditioner may shake or be deformed by an external force such as the earthquake because the cabinet supports components having great weights, such as a compressor and the outdoor unit.

SUMMARY

An outdoor unit of an air conditioner according to an embodiment of the disclosure includes: a cabinet including a base panel and a side panel; a compressor supported by the cabinet; a heat exchanger supported by the cabinet; and a leg frame at a lower end of the cabinet to support the cabinet, wherein the leg frame includes: a channel including an upper flange coupled to the base panel, a lower flange installable on an installation surface, and a web connecting the upper flange with the lower flange; and a first coupling portion and a second coupling portion configured to fix one side portion of the channel to the side panel, and positioned on opposite sides with the channel interposed therebetween to prevent a center of gravity of the channel from moving or the channel from being deformed by shaking of the side panel.

The leg frame may include: a first coupling flange extending upward from one end of the lower flange, wherein the first coupling portion is formed in the first coupling flange; and a second coupling flange extending from a side end of the web in a direction of being spaced away from the first coupling portion, wherein the second coupling portion is formed in the second coupling flange.

The channel may extend in a left-right direction, and the center of gravity of the channel is positioned between the first coupling portion and the second coupling portion in a front-rear direction, as seen in a side direction.

The center of gravity of the channel may be identical to a centroid of a cross section of the channel.

The centroid of the cross section of the channel may be positioned at a higher location than a straight line passing the first coupling portion and the second coupling portion.

The side panel may include: a side plate portion; and a flange portion bent from one end of the side plate portion, wherein the first coupling portion may be fixed to the flange portion, and the second coupling portion may be fixed to the side plate portion.

The first coupling flange may face the flange portion, and the second coupling flange may face the side plate portion.

The base panel may include a third coupling portion fixed to the side panel.

The side panel may include a step portion bent from one end of the flange portion, and the third coupling portion may be fixed to the step portion.

The third coupling portion may be positioned at a higher location than the first coupling portion and the second coupling portion.

The center of gravity of the channel may be positioned inside a triangle of which apexes are the first coupling portion to the third coupling portion, as seen in a side direction.

The outdoor unit may further include a reinforcing bracket positioned at a lower end of the side panel and supporting the side panel.

The reinforcing bracket may include: a bracket body; a third coupling flange extending from a lower end of the bracket body in a side direction, wherein a fourth coupling portion fixed to the lower flange is formed in the third coupling flange; and a fourth coupling flange extending from an upper end of the bracket body, wherein a fifth coupling portion corresponding to the third coupling portion and fixed to the side panel is formed in the fourth coupling flange.

The reinforcing bracket may further include a fifth coupling flange extending from a side end of the bracket body and supporting the flange portion, and a sixth coupling portion corresponding to the first coupling portion and fixed to the flange portion may be formed in the fifth coupling flange.

An insertion groove in which the reinforcing bracket is inserted may be formed in the upper flange.

In another aspect, an outdoor unit of an air conditioner according to a concept of the disclosure includes: a base panel; a leg frame coupled to the base panel; a side panel of which one surface is supported by the base panel and the leg panel; a first coupling member configured to fix the side panel to the base panel; a second coupling member configured to fix the side panel to the leg frame; and a reinforcing bracket configured to support the other surface of the side panel and fixed to the side panel by at least one of the first coupling member or the second coupling member.

The side panel may include: a side plate portion; a flange portion bent from one end of the side plate portion; and a step portion connected to one end of the flange portion and including a step surface being in parallel to the flange portion and a connecting surface connecting the step surface with the flange portion, wherein the reinforcing bracket is in contact with the flange portion and the step portion to support the side frame.

The reinforcing bracket may include: a bracket body positioned on the step portion; and a first coupling flange extending from an upper end of the bracket body to be in parallel to the step surface, and fixed to the step surface by the first coupling member.

The reinforcing bracket may further include a second coupling flange extending from a side end of the bracket body to be in parallel to the flange portion, and fixed to the flange portion by the second coupling member.

The leg frame may further include a third coupling flange coupled to the side plate portion.

Additional aspects will be set forth in part in the description which follows and, in part, will be apparent from the description, or may be learned by practice of the presented embodiments.

BRIEF DESCRIPTION OF THE DRAWINGS aspects, features, and advantages of certain embodiments of the disclosure will be more apparent from the following description taken in conjunction with the accompanying drawings, in which.

DETAILED DESCRIPTION

Figure 1:
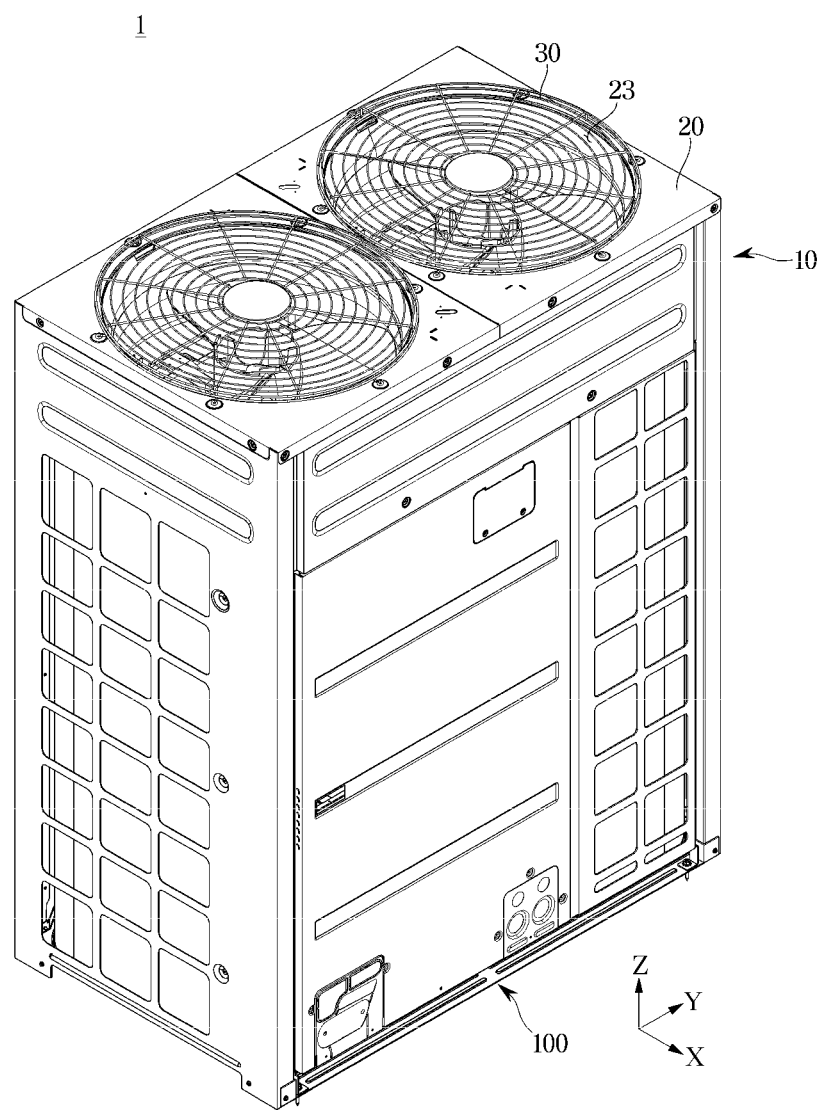
FIG. 1 is a perspective view of an outdoor unit of an air conditioner according to an embodiment of the disclosure.

Configurations illustrated in the embodiments and the drawings described in the present specification are only the preferred embodiments of the present disclosure, and thus it is to be understood that various modified examples, which may replace the embodiments and the drawings described in the present specification, are possible when filing the present application.

Also, like reference numerals or symbols denoted in the drawings of the present specification represent members or components that perform the substantially same functions.

Also, the terms used in the present specification are merely used to describe the embodiments, and are not intended to limit and/or restrict the disclosure. An expression used in the singular encompasses the expression of the plural, unless it has a clearly different meaning in the context. In the present specification, it is to be understood that the terms such as "comprising", "including" or "having", etc., are intended to indicate the existence of the features, numbers, steps, operations, components, parts, or combinations thereof disclosed in the specification, and are not intended to preclude the possibility that one or more other features, numbers, steps, operations, components, parts, or combinations thereof may exist or may be added.

Also, it will be understood that, although the terms including ordinal numbers, such as "first", "second", etc., may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

Meanwhile, in the following description, the terms "front", "rear", "left", and "right" are defined based on the drawings, and the shapes and positions of the components are not limited by the terms. For example, a direction in which a front cabinet of an air conditioner according to an embodiment of the disclosure, as shown in FIG. 1, faces may be referred to as a 'front direction', and a direction in which a rear cabinet not shown in FIG. 1 faces may be referred to as a 'rear direction'.

An aspect of the disclosure provides an outdoor unit of an air conditioner with improved stiffness.

Another aspect of the disclosure provides an outdoor unit of an air conditioner capable of reducing material cost and component cost.

According to various embodiments of the disclosure, because a leg frame stably supports a cabinet, shaking and deformation that may be caused by an external force may be minimized.

Moreover, according to various embodiments of the disclosure, by simplifying a support structure for supporting a cabinet and reducing a number of coupling members, material cost and component cost may be reduced.

Hereinafter, an embodiment of the disclosure will be described in detail with reference to the accompanying drawings.

Figure 2:
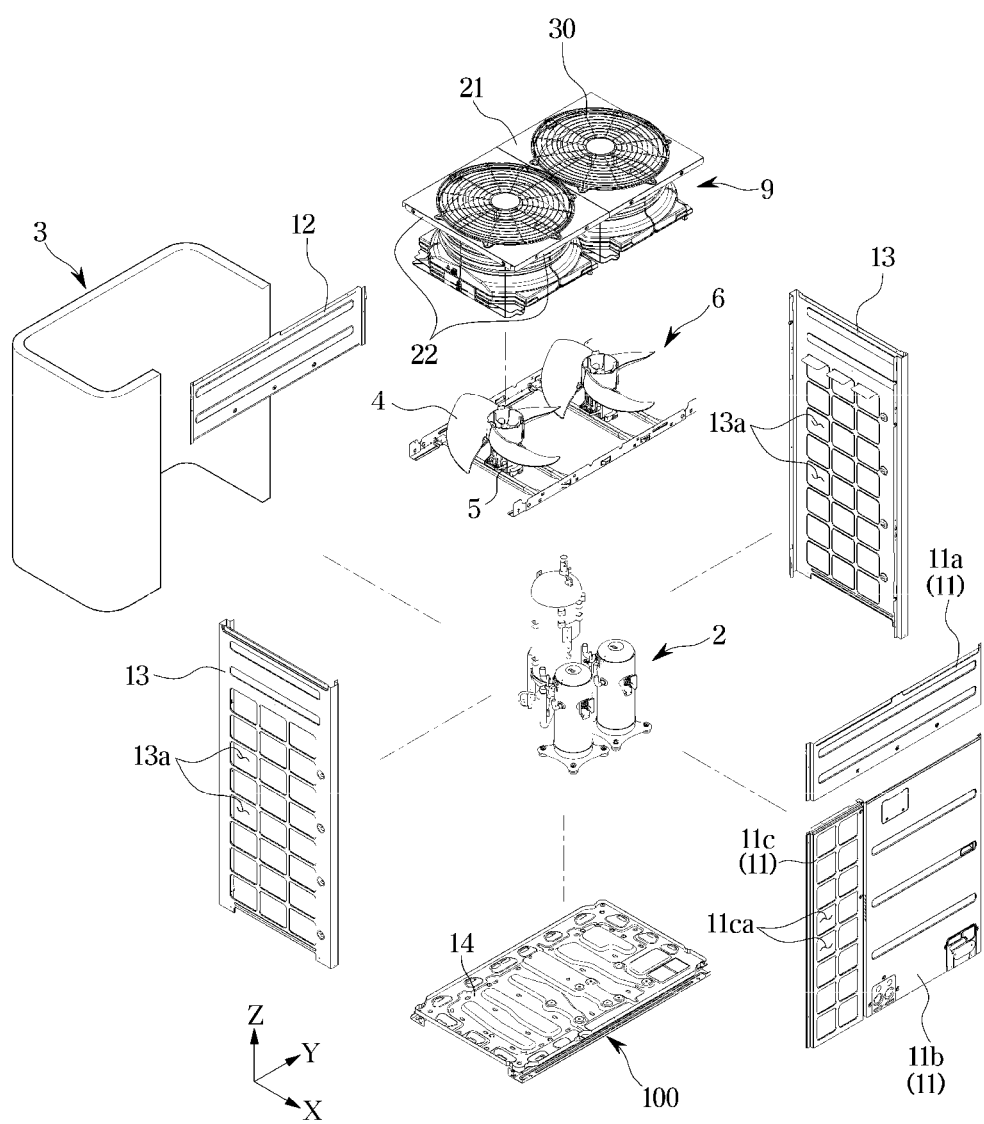
FIG. 2 is an exploded perspective view of the outdoor unit shown in FIG. 1.

FIG. 1 is a perspective view of an outdoor unit of an air conditioner according to an embodiment of the disclosure. FIG. 2 is an exploded perspective view of the outdoor unit shown in FIG. 1.

Referring to FIGS. 1 and 2, an outdoor unit 1 may include a cabinet 10 forming an appearance, a compressor 2 positioned inside the cabinet 10 and configured to compress a refrigerant, a heat exchanger 3 for performing heat exchange with outside air, a blow fan 4 for causing outside air to pass through a main body of the outdoor unit 1 to perform heat exchange with the heat exchanger 3, and a driving motor 5 for rotating the blow fan 4.

The cabinet 10 may be substantially in a shape of a box of which an upper side opens, and the outdoor unit 1 may include a blow fan cover 20 positioned on an upper side of the cabinet 10 to cover the blow fan 4 and the cabinet 10. In FIG. 2, two blow fans 4 are shown, although not limited thereto. One or three or more blow fans 4 may be provided.

The cabinet 10 may form front, rear, left, right, and lower surfaces of the outdoor unit 1. The cabinet 10 may include a front panel 11 forming the front surface of the outdoor unit 1, a rear panel 12 forming the rear surface of the outdoor unit 1, a pair of side panels 13 forming the left and right surfaces of the outdoor unit 1, and a base panel 14 forming the lower surface of the cabinet 10.

Because the pair of side panels 13 has a symmetric structure, one side panel 13 of the pair of side panels 13 will be described below. However, the pair of side panels 13 will be referred to as a 'pair of side panels', as necessary, and one side panel 13 will be referred to as a 'side panel'.

The blow fan cover 20 may include an upper plate 21 including an outlet 23 through which air heat-exchanged with the heat exchanger 3 through the blow fan 4 is discharged, and an extension portion 22 extending downward from edges of the upper plate 21.

The blow fan 4 may be positioned in an upper space of the cabinet 10. A cylindrical molded body 9 provided outside the blow fan 4 in a radial direction of the blow fan 4 and configured to guide air from the blow fan 4 to the outlet 23 may be provided.

The heat exchanger 3 may be bent to be adjacent to the pair of side panels 13 and the rear panel 20 and extend. Accordingly, the side panel 13 may include a side inlet 13a through which air is sucked into the outdoor unit 1 of the air conditioner to perform heat exchange with the heat exchanger 3.

The rear panel 12 may have a shorter length in an up-down direction Z than the front panel 11 and the side panel 13. Accordingly, an opening (not shown) surrounded by the rear panel 12, the base panel 14, and the pair of side panels 13 may be formed below the rear panel 12. Air may enter inside of the outdoor unit 1 through the side inlet 13a, the opening (not shown), and a front inlet 11ca, perform heat exchange with the heat exchanger 3, and then be discharged to outside of the outdoor unit 1 through the outlet 23 provided in an upper side of the outdoor unit 1 of the air conditioner.

The front panel 11 may be divided into a front upper panel 11a and a front lower panel 11b. The front panel 11 may include a grill panel 11c including the inlet 11ca through which air is sucked into the inside of the outdoor unit 1 to perform heat exchange with the heat exchanger 3. In other words, the front panel 11 may include three components 11a, 11b, and 11c, although not limited thereto. However, the front panel 11 may be formed as one body.

The rear panel 12 may have a size corresponding to the front upper panel 11a. The rear panel 12 may extend downward from one side of the cabinet 10 at which the blow fan cover 20 is positioned, together with the front panel 11, wherein a length in up-down direction Z of the rear panel 12 may extend up to a length of the front upper panel 11a, although not limited thereto. However, the rear panel 12 may be longer than the front upper panel 11a in the up-down direction Z, or may correspond to the length in up-down direction Z of the front panel 11.

The outdoor unit 1 may include a blow fan coupling portion 6 which is positioned inside the cabinet 10 and which the blow fan 4 is coupled to and supported by.

The cylindrical molded body 9 may be coupled with an inner side of the upper plate 21 of the blow fan cover 20. Also, in an upper side of the upper plate 21, a fan guard 30 for protecting the outlet 23 may be provided. The blow fan cover 20 may include the extension portion 22 extending downward from the four edges of the upper plate 21, and the extension portion 22 may be positioned out of the cabinet 10 to cover upper ends of the front panel 11, the rear panel 12, and the side panel 13.

The outdoor unit 1 may include a leg frame 100 for supporting the cabinet 10. The leg frame 100 may be coupled with the base panel 14. The leg frame 100 may be coupled with the side panel 13. The leg frame 100 may include a pair of leg frames 100. The pair of leg frames 100 may be respectively positioned at a front lower end and a rear lower end of the cabinet 10.

Figure 3:
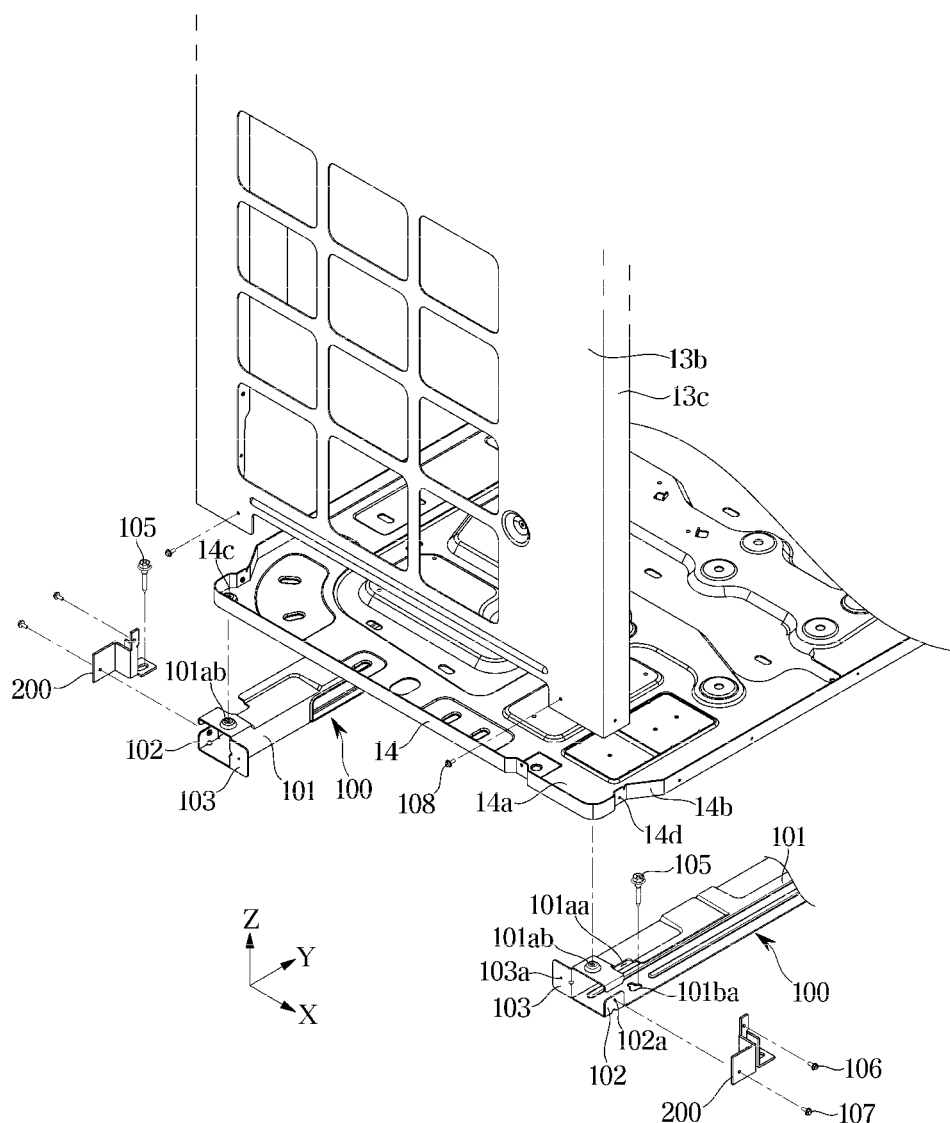
FIG. 3 is an exploded view showing some components of the outdoor unit shown in FIG. 1.
Figure 4:
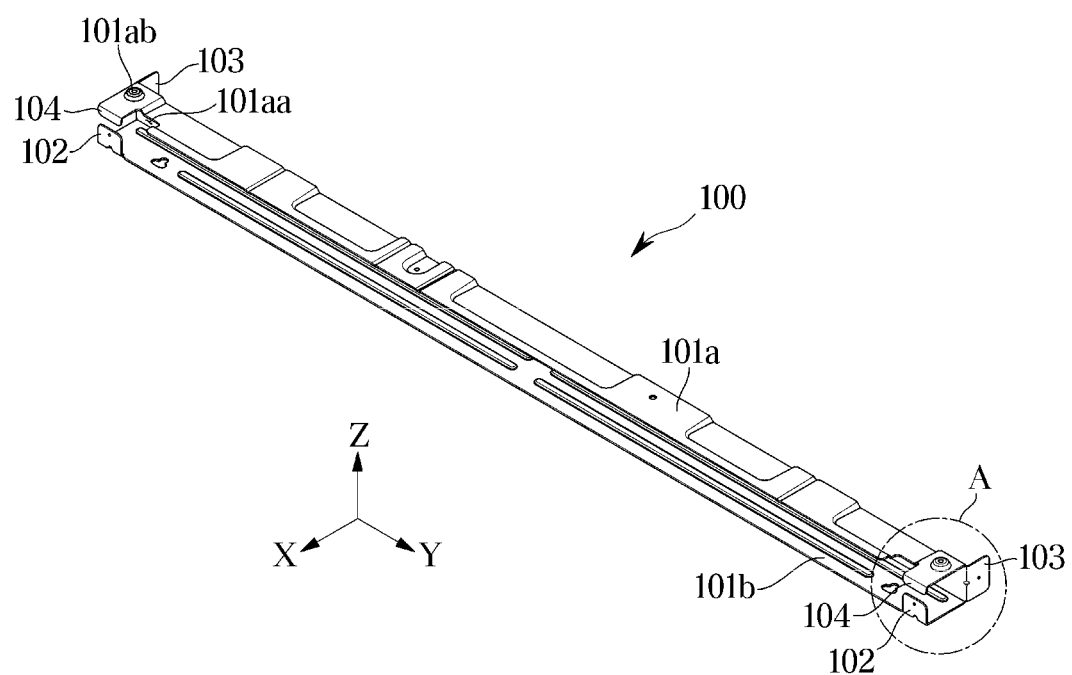
FIG. 4 is a perspective view of a leg frame of the outdoor unit shown in FIG. 1.
Figure 5:
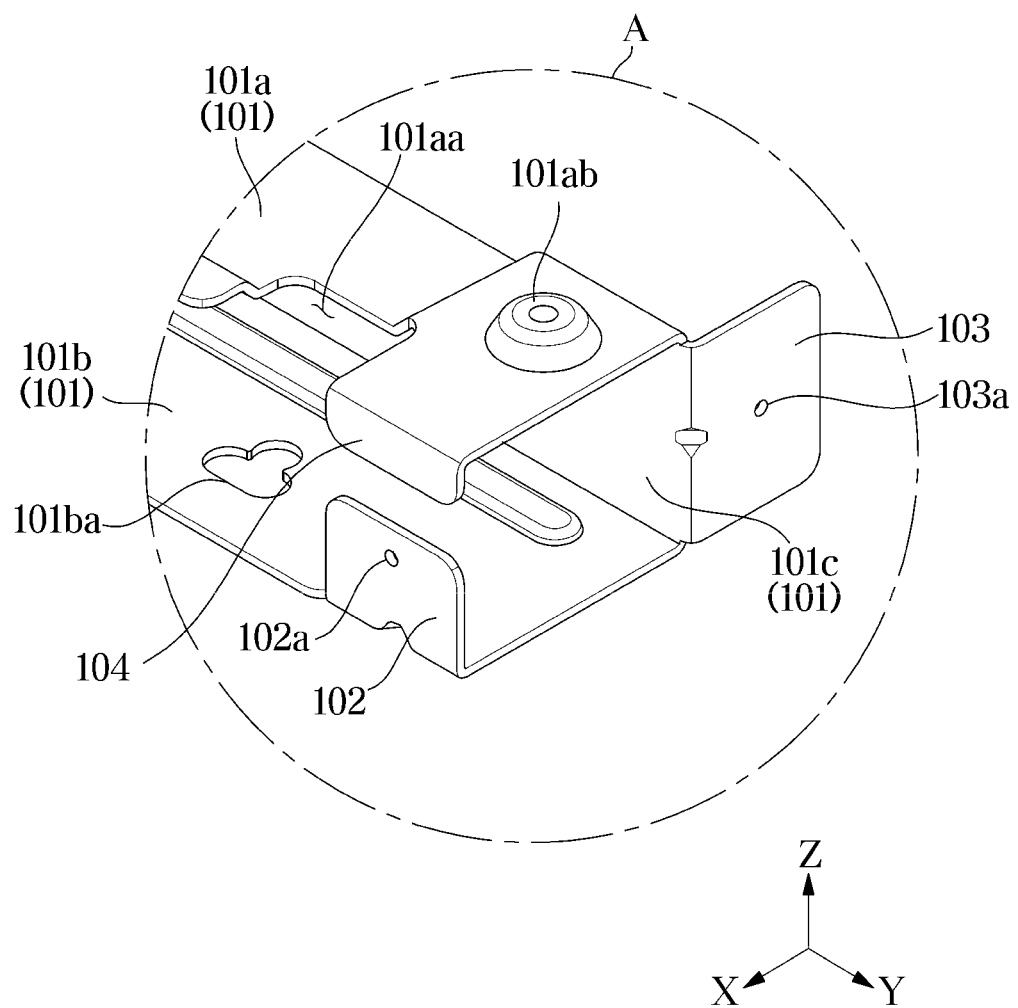
FIG. 5 is an enlarged view of an area A of FIG. 4.
Figure 6:
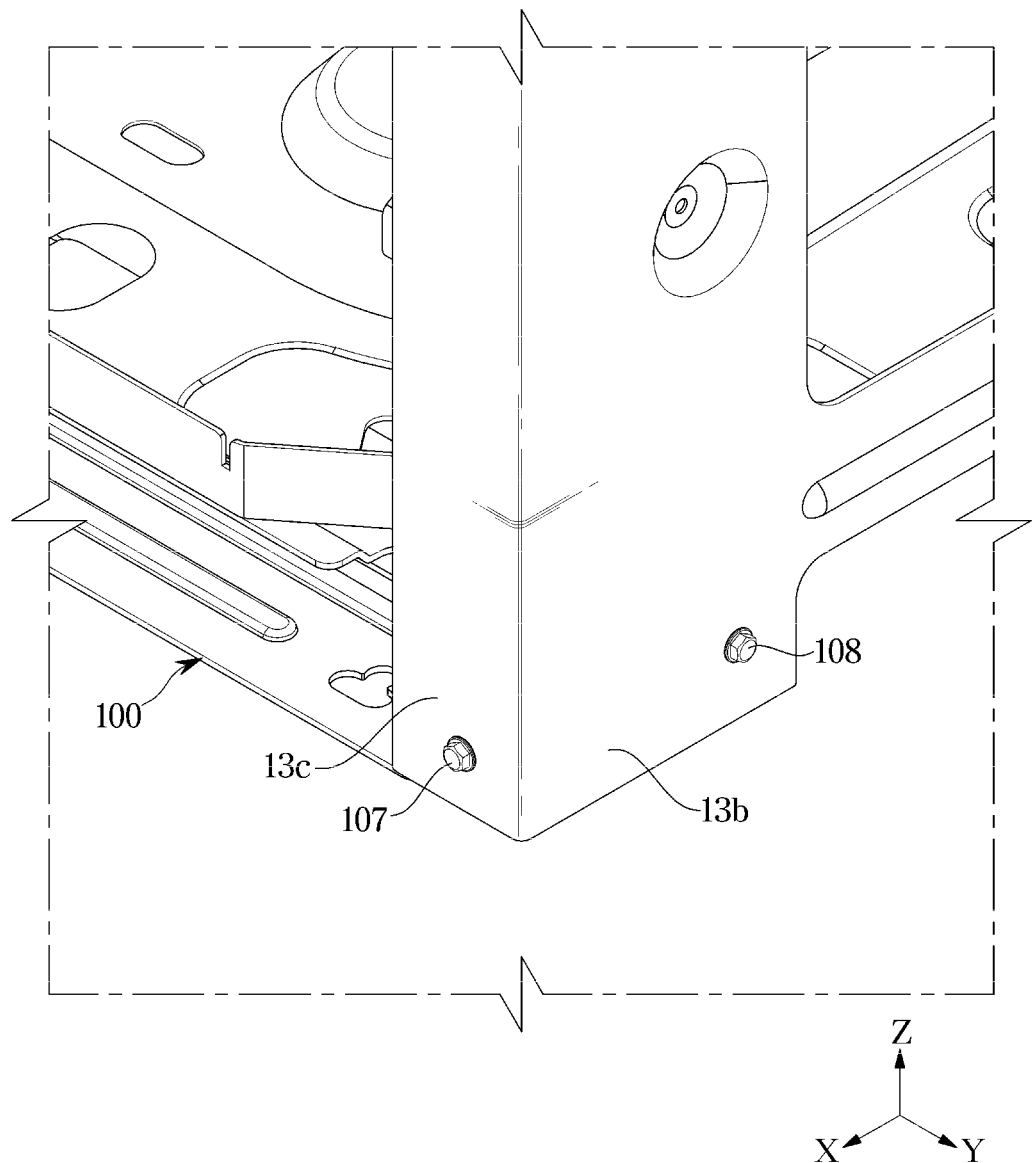
FIG. 6 shows a state in which a reinforcing bracket is omitted from the outdoor unit shown in FIG. 1.
Figure 7:
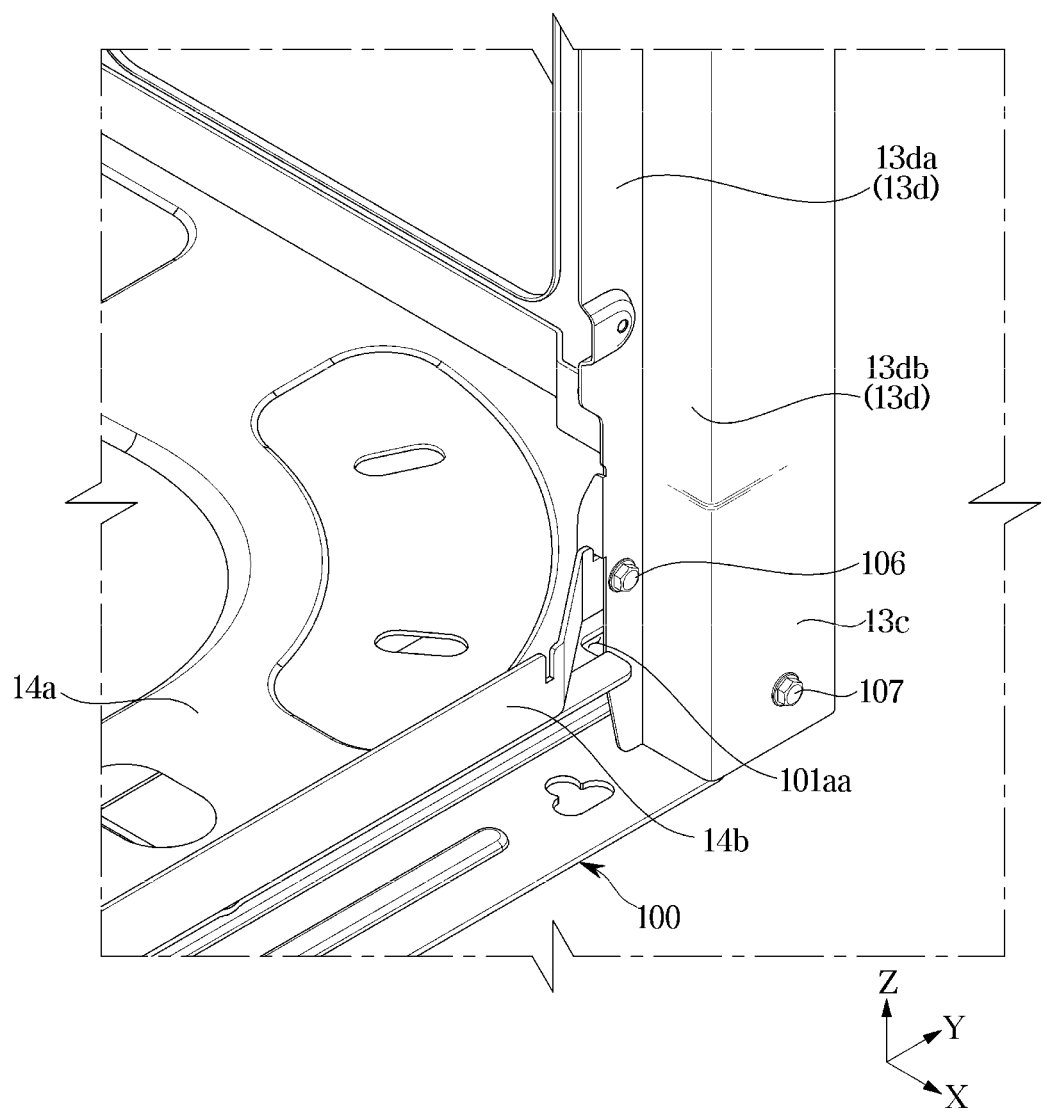
FIG. 7 shows the outdoor unit shown in FIG. 6 from another angle.

FIG. 3 is an exploded view showing some components of the outdoor unit shown in FIG. 1. FIG. 4 is a perspective view of a leg frame of the outdoor unit shown in FIG. 1. FIG. 5 is an enlarged view of an area A of FIG. 4. FIG. 6 shows a state in which a reinforcing bracket is omitted from the outdoor unit shown in FIG. 1. FIG. 7 shows the outdoor unit shown in FIG. 6 from another angle.

Hereinafter, a coupling relationship between the base panel 14, the side panel 13, and the leg frame 100 will be described in detail with reference to FIGS. 3 to 7.

The base panel 14 may include a bottom plate portion 14a forming a lower surface of the base panel 14 and being substantially in a shape of a flat plate, and a circumferential surface 14b provided along a circumference of the bottom plate portion 14a and extending upward from the circumference of the bottom plate portion 14a to form front, rear, left, and right surfaces of the base panel 14. Components of a cooling cycle, including the compressor 2, may be rested on the base panel 14. The base panel 14 may be fixed to the side panel 13. The base panel 14 may be supported by the leg frame 100 which will be described below.

The side panel 13 may include a side plate portion 13b forming a side surface of the cabinet 10, and a pair of flange portions 13c respectively bent substantially perpendicularly from both side ends of the side plate portion 13b and extending.

In the side plate portion 13b, a plurality of side inlets 13a through which outside air is sucked into the inside of the cabinet 10 may be formed. In a lower end of the side plate portion 13b, a cutout may be formed by cutting a portion of the side plate portion 13b.

The flange portion 13c may form the front surface of the outdoor unit 1 together with the front panel 11, or may form the rear surface of the outdoor unit 1 together with the rear panel 12.

The side panel 13 may include a step portion 13d bent from one end of the flange portion 13c to be stepped toward the inside of the cabinet 10. More specifically, the step portion 13d may include a step surface 13da spaced from the flange portion 13c in a direction toward the inside of the cabinet 10 and being in parallel to the flange portion 13c, and a connecting surface 13db connecting the step surface 13da with the one end of the flange portion 13c. The connecting surface 13db may be bent substantially perpendicularly from the one end of the flange portion 13c, and the step surface 13da may be bent substantially perpendicularly from one end of the connecting surface 13db.

The step portion 13d may be coupled to the base panel 14. More specifically, the base panel 14 may include a coupling portion 14d formed in the circumferential surface 14b and fixed to the step portion 13d, and the side panel 13 may be coupled to the base panel 14 by a coupling member 106 penetrating the step surface 13da and the coupling portion 14d.

Both side portions of the leg frame 100 may be fixed to the side panel 13. More specifically, the leg frame 100 may extend in a left-right direction Y, a left side portion of the leg frame 100 may be fixed to the side panel 13 forming the left surface of the cabinet 10, and a right side portion of the leg frame 100 may be fixed to the side panel 13 forming the right surface of the cabinet 10.

The leg frame 100 may include a channel 101 forming a body of the leg frame 100. A cross section of the channel 101 may be substantially a ⊏-shaped type or a ⊐-shaped mirror type.

The channel 101 may include an upper flange 101a forming an upper surface of the channel 101, a lower flange 101b forming a lower surface of the channel 101, and a web 101c connecting one end of the upper flange 101a with one end of the lower flange 101b. The upper flange 101a, the lower flange 101b, and the web 101c may be integrated into one body.

The upper flange 101a may be coupled to the base panel 14. More specifically, the upper flange 101a may include a resting protrusion 101ab, and the base panel 14 may include a resting groove 14c corresponding to the resting protrusion 101ab. The resting protrusion 101ab may be coupled to the resting groove 14c, and the upper flange 101a may be fixed to the base panel 14 by a coupling member penetrating the resting groove 14c and the resting protrusion 101ab. The coupling member may include a positioning member, such as a screw, a pin, etc. The upper flange 101a may be in contact with the base panel 14 to support the base panel 14.

The leg frame 100 may include an insertion groove 101aa formed in the upper flange 101a to correspond to the step portion 13d. The step portion 13d may be inserted in the insertion groove 101aa.

The web 101c may be bent from one end of the upper flange 101a and extend substantially perpendicularly downward.

The lower flange 101b may be bent from a lower end of the web 101c and extend to face the upper flange 101a in parallel to the upper flange 101a. The lower flange 101b may be installed on an installation surface on which the outdoor unit 1 is installed. More specifically, the channel 101 may include a plurality of installation portions 101ba formed at both side portions of the lower flange 101b by penetrating the lower flange 101b, and the channel 101 may be fixed to the installation surface by an anchor bolt 105 penetrating the installation portions 101ba, although not limited thereto. However, the leg frame 100 may be installed by another method such as welding for fixing the leg frame 100 to the installation surface.

The leg frame 100 may include a first coupling portion 102a and a second coupling portion 103a for fixing one side portion of the channel 101 to the side panel 13. The first coupling portion 102a and the second coupling portion 103a may be positioned on opposite sides with the channel 101 interposed therebetween. In other words, the channel 101 may be positioned between the first coupling portion 102a and the second coupling portion 103a. The first coupling portion 102a may include a pair of first coupling portions 102a respectively provided at both side portions of the channel 101, and the second coupling portion 103a may include a pair of second coupling portions 103a respectively provided at both side portions of the channel 101.

The first coupling portion 102a may be fixed to the flange portion 13c. More specifically, the first coupling portion 102a may support the flange portion 13c on an inner surface of the flange portion 13c, which is opposite to an outer surface of the flange portion 13c forming an appearance, and the first coupling portion 102a may be fixed to the flange portion 13c by a first coupling member 107 penetrating the flange portion 13c and the first coupling portion 102a.

The second coupling portion 103a may be fixed to the side plate portion 13b. More specifically, the second coupling portion 103a may support the side plate portion 13b on an inner surface of the side plate portion 13b, which is opposite to an outer surface of the side plate portion 13b forming an appearance, and the second coupling portion 103a may be fixed to the side plate portion 13b by a second coupling member 108 penetrating the side plate portion 13b and the second coupling portion 103a.

The leg frame 100 may include a first coupling flange 102 extending upward from the other end of the lower flange 101b, which is opposite to the one end of the lower flange 101b, connected with the web 101c, wherein the first coupling portion 102a may be formed in the first coupling flange 102. The first coupling flange 102 may be bent substantially perpendicularly from the other end of the lower flange 101b. The first coupling flange 102 may face the flange portion 13c.

The leg frame 100 may include a support flange 104 extending downward from the other end of the upper flange 101a, which is opposite to the one end of the upper flange 101a, connected with the web 101c, the support flange 104 supporting the flange portion 13c. The support flange 104 may be bent substantially perpendicularly from the other end of the upper flange 101a toward the first coupling flange 102. The support flange 104 may face the flange portion 13c.

The leg frame 100 may include a second coupling flange 103 extending from a side end of the web 101c in a direction of being spaced away from the first coupling portion 102a, wherein the second coupling portion 103a is formed in the second coupling flange 103. The second coupling flange 103 may be bent perpendicularly in a front-rear direction X from the side end of the web 101c toward a vertical center axis of the side plate portion 13b.

At least one or more of the channel 101, the first coupling flange 102, the second coupling flange 103, or the support flange 104 may be integrated into one body.

Figure 8:
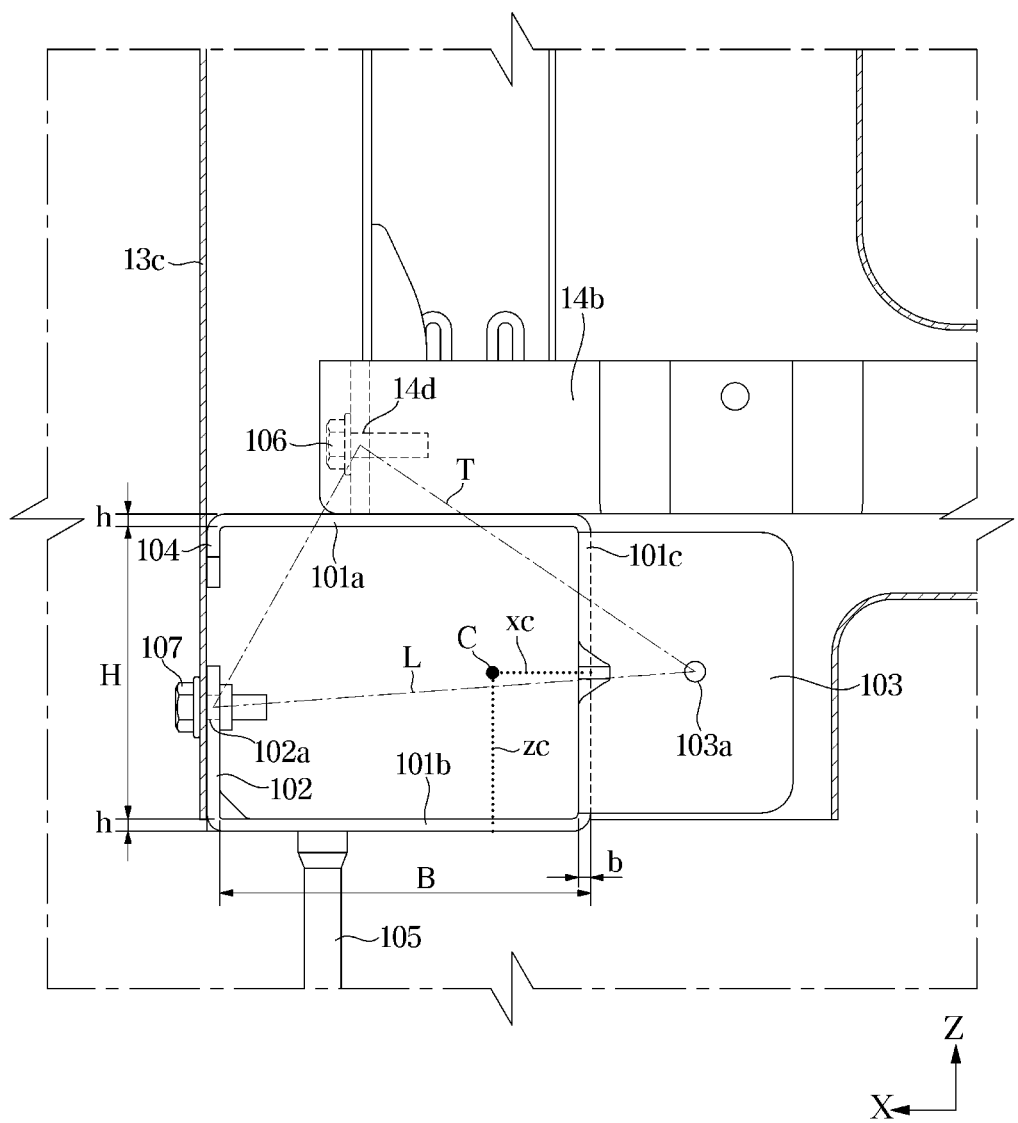
FIG. 8 is a cross-sectional view obtained by cutting a portion of the outdoor unit shown in FIG. 6.

FIG. 8 is a cross-sectional view obtained by cutting a portion of the outdoor unit shown in FIG. 6.

Referring to FIG. 8, because the channel 101 is positioned between the first coupling portion 102a and the second coupling portion 103a, a centroid of a cross section of the channel 101 may be positioned between the first coupling portion 102a and the second coupling portion 103a in the front-rear direction X, as seen in a side direction. More specifically, the centroid of the cross section of the channel 101 may be positioned at a higher location than a straight line L connecting the first coupling portion 102a with the second coupling portion 103a.

The centroid C of the cross section of the channel 101 may be positioned at a lower location than the coupling portion 14d (hereinafter, referred to as a third coupling portion) of the base panel 14. More specifically, the third coupling portion 14d may be positioned between the first coupling portion 102a and the second coupling portion 103a in the front-rear direction X, as seen in the side direction. The centroid C of the cross section of the channel 101 may be positioned inside a triangle T of which apexes are the first coupling portion 102a to the third coupling portion 14d, as seen in the side direction. In other words, the centroid C of the cross section of the channel 101 may be positioned inside a triangle T of which apexes are three coupling members 106, 107, and 108 respectively penetrating the first coupling portion 102a to the third coupling portion 14d, as seen in the side direction.

A material forming the channel 101 may have uniform density, and in this case, the centroid C of the cross section of the channel 101 may correspond to a center of gravity of the channel 101. More specifically, an entire center of gravity of the channel 101 may be identical to a centroid C of a cross section of the channel 101 in a substantially center portion of a length in left-right direction Y of the channel 101, and a center of gravity of a cross section of the channel 101 may be identical to a centroid C of the cross section of the channel 101.

Meanwhile, because cross sections of the channel 101 have the same or similar shape along the length in the left-right direction Y, centroids C of two arbitrary cross sections of the channel 101 may have the same coordinate values on the front-rear (X) axis and the up-down (Z) axis although having different coordinate values on the left-right (Y) axis. That is, the centroids C of the channel 101 may be seen as a single point C in the side direction.

Referring to FIG. 8, the centroid C of the channel 101 may be obtained by the following equation.

$$A = 2Bh + Hb \quad \text{[Equation 1]}$$

$$xc = (2hB^2/2 + b^2H/2)/A \quad \text{[Equation 2]}$$

$$zc = H/2 + h, \quad \text{[Equation 3]}$$

wherein H is a distance between an inner surface of the upper flange 101a and an inner surface of the lower flange 101b, h is a thickness of each of the upper flange 101a and the lower flange 101b, b is a thickness of the web 101c, B is a width of the channel 101, xc is a distance from an outer surface of the web 101c in an X-axis direction, and zc is a distance from an outer surface of the lower flange 101b in a Z-axis direction. The thickness of the upper flange 101a may be substantially equal to the thickness of the lower flange 101b.

The centroid C of the channel 101 may be easily calculated by one of ordinary skill in the art by using a Computer Aided Design (CAD) program or the like widely known in the art.

As such, because the centroid C or the center of gravity of the channel 101 is positioned between the first coupling portion 102a and the second coupling portion 103a or surrounded by a plurality of imaginary lines connecting two of the first channel portion 102a to the third coupling portion 14d, shaking or deformation of the channel 101, which is caused by shaking of the side panel 13, may be reduced, and accordingly, the centroid C or the center of gravity may be prevented from moving.

Also, because the second coupling flange 103 extends in an opposite direction of a direction in which the upper flange 101a and the lower flange 101b extend from the web 101c, the web 101c may be prevented from being deformed such that a distance between the upper flange 101a and the lower flange 101b increases.

Accordingly, although the cabinet 10 shakes by an external force such as the earthquake, the leg frame 100 may stably support the cabinet 10, and deformation of the leg frame 100 and the side panel 13 may be minimized.

Furthermore, a support structure of the cabinet 10 may be simplified, and desired stiffness may be obtained while minimizing the use of coupling members, resulting in a reduction of additional material cost and component cost.

Figure 9:
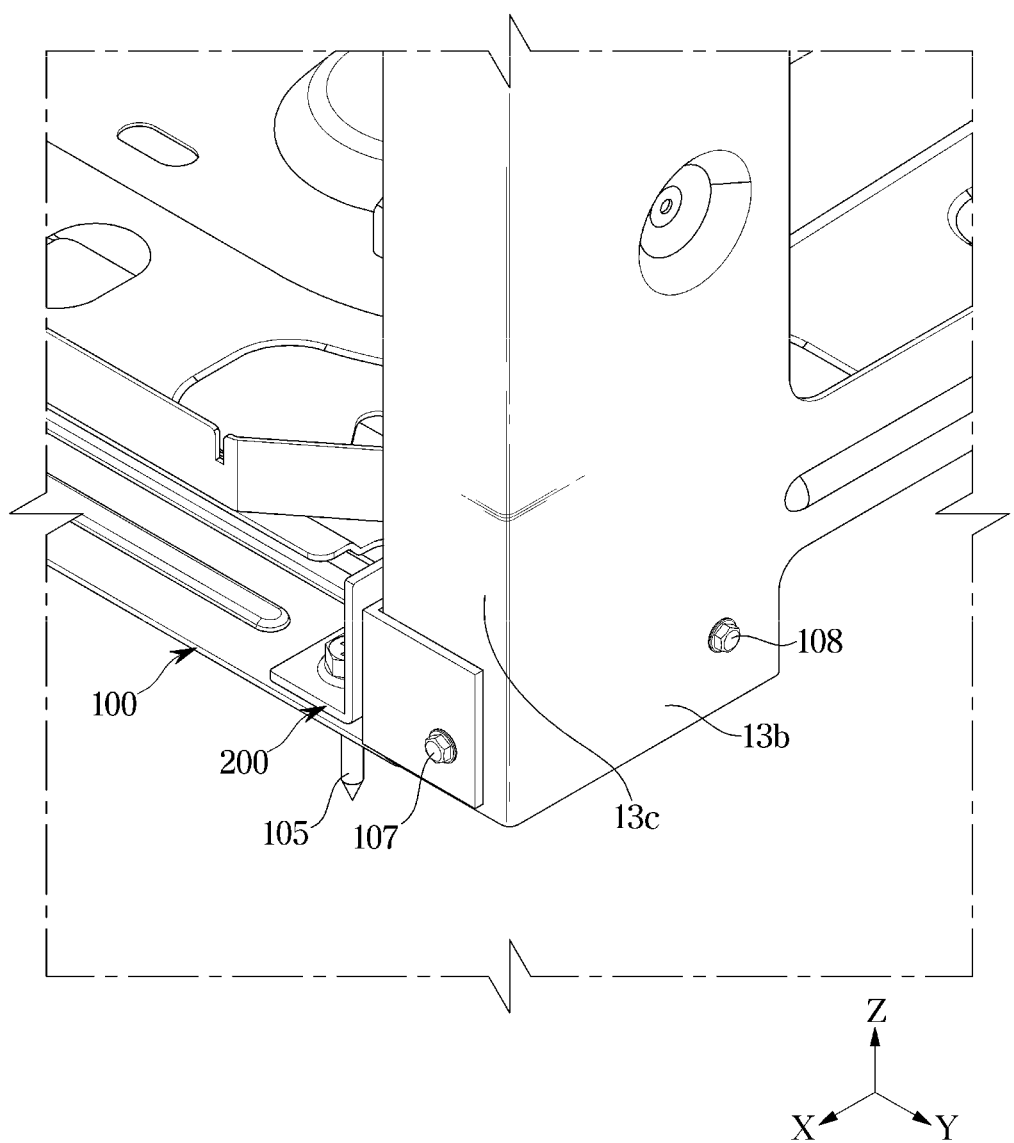
FIG. 9 shows a state in which a reinforcing bracket is installed in the outdoor unit shown in FIG. 1.
Figure 10:
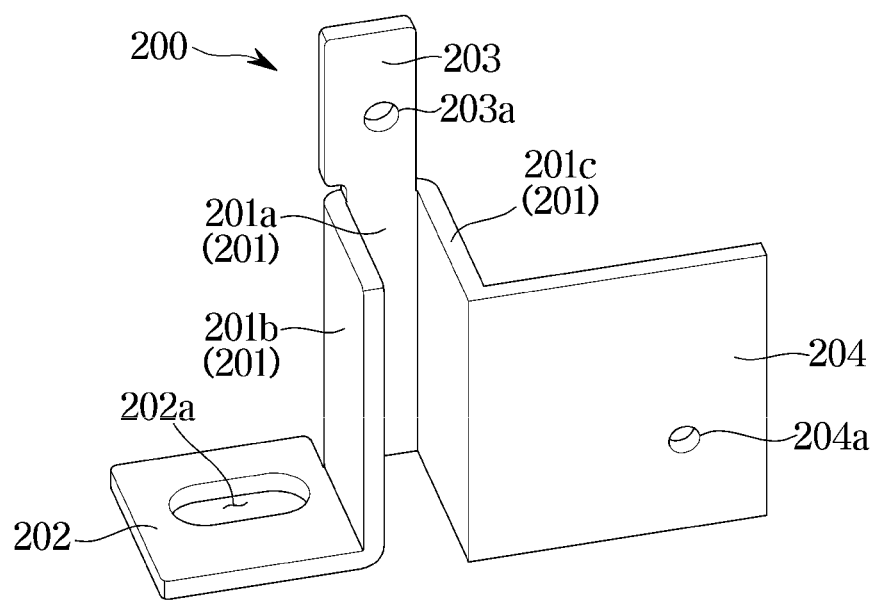
FIG. 10 is a perspective view of the reinforcing bracket shown in FIG. 9.
Figure 11:
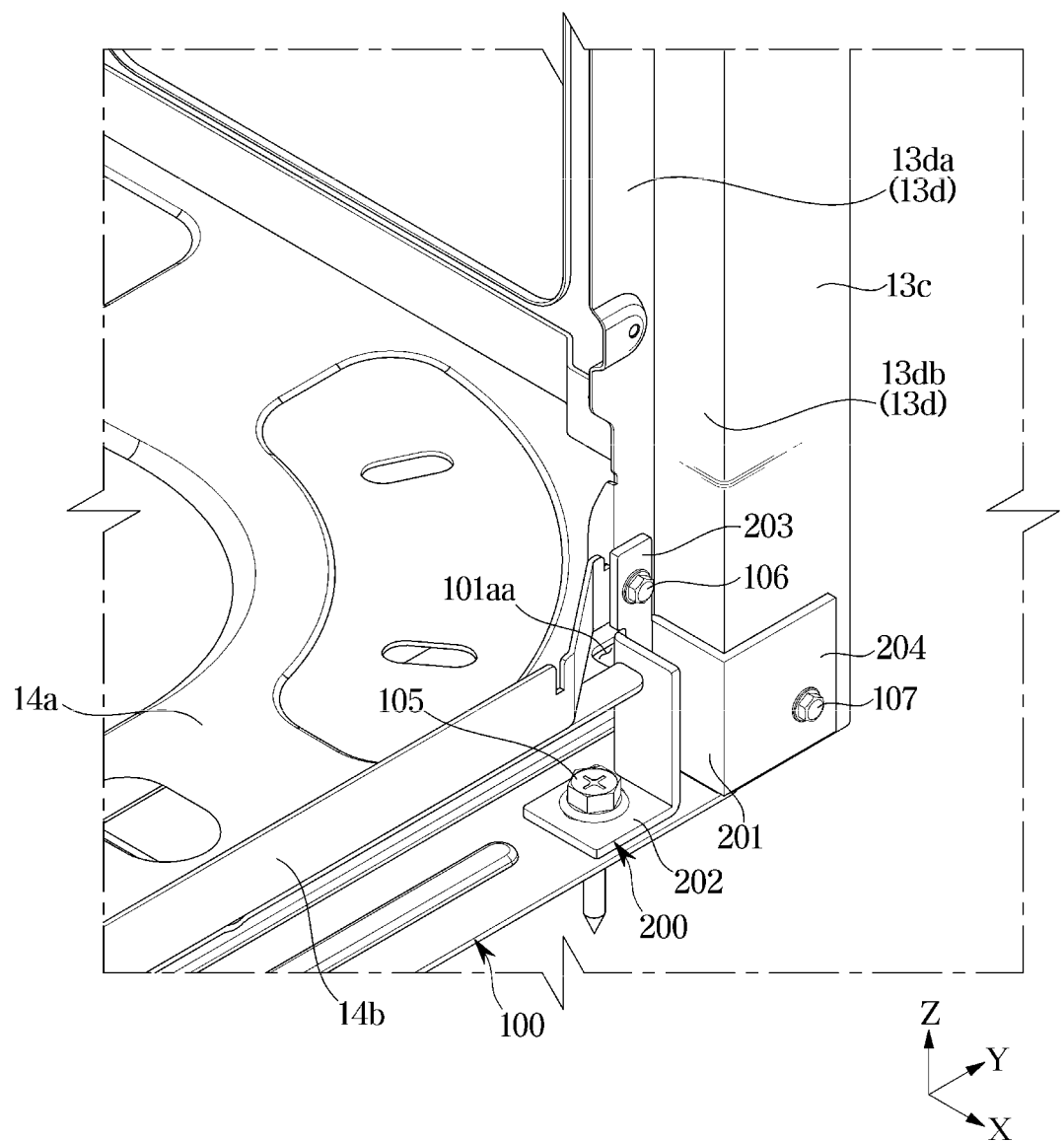
FIG. 11 shows the outdoor unit shown in FIG. 9 from another angle.
Figure 12:
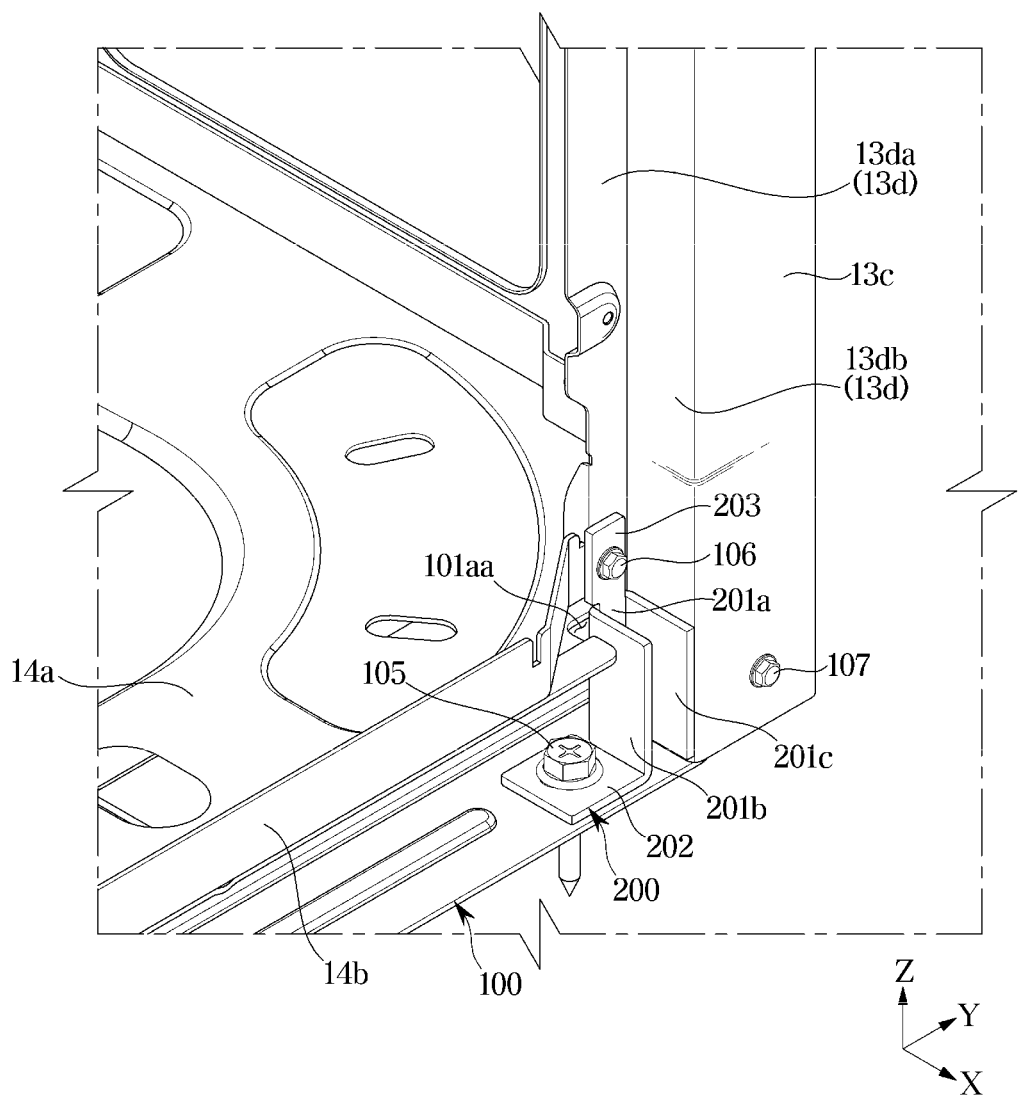
FIG. 12 shows a reinforcing bracket according to another embodiment of the disclosure.
Figure 13:
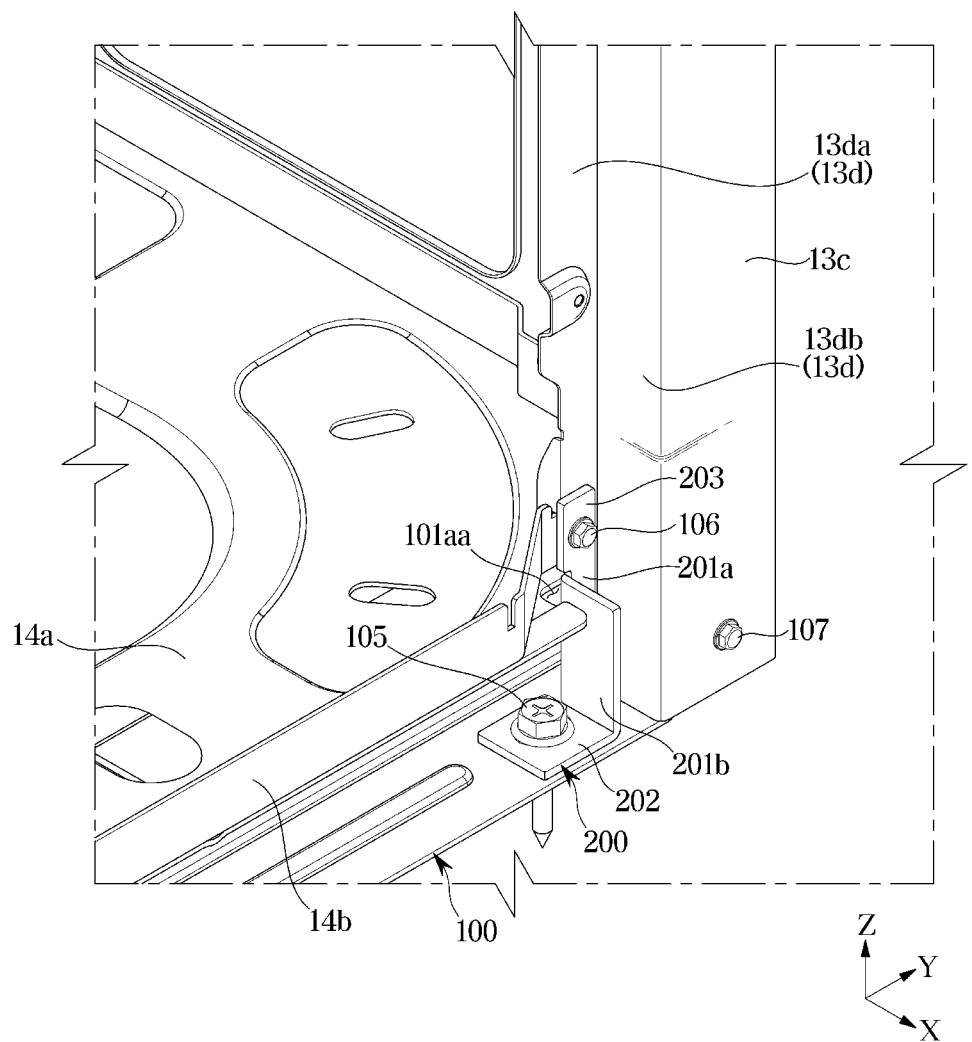
FIG. 13 shows a reinforcing bracket according to still another embodiment of the disclosure.

FIG. 9 shows a state in which a reinforcing bracket is installed in the outdoor unit shown in FIG. 1. FIG. 10 is a perspective view of the reinforcing bracket shown in FIG. 9. FIG. 11 shows the outdoor unit shown in FIG. 9 from another angle. FIG. 12 shows a reinforcing bracket according to another embodiment of the disclosure. FIG. 13 shows a reinforcing bracket according to still another embodiment of the disclosure.

Referring to FIGS. 9 to 11, the outdoor unit 1 may further include a reinforcing bracket 200 configured to support the side panel 13. The reinforcing bracket 200 may be positioned at a lower end of the side panel 13. Because the reinforcing bracket 200 is optional, a user may manufacture or use the outdoor unit 1 including no reinforcing bracket 200 or the outdoor unit 1 including the reinforcing bracket 200.

The reinforcing bracket 200 may include a bracket body 201, a fourth coupling portion 202a fixing the bracket body 201 to the lower flange 101b, a fifth coupling portion 203a positioned at a location corresponding to the third coupling portion 14d and fixing the bracket body 201 to the side panel 13, and a sixth coupling portion 204a positioned at a location corresponding to the first coupling portion 102a and fixing the bracket body 201 to the side panel 13.

The reinforcing bracket 200 may be positioned on the lower flange 101b. More specifically, a lower end of the bracket body 201 may be positioned on the lower flange 101b, and an upper end of the bracket body 201 may be inserted in the insertion groove 101aa.

The bracket body 201 may include a first wall 201a extending in the up-down direction Z to be in parallel to the step surface 13da and being in contact with the step surface 13da to support the step surface 13da, a second wall 201b extending from one side end of the first wall 201a to be in parallel to the connection surface 13db while being spaced from the connecting surface 13db, and a third wall 201c extending from the other side end of the first wall 201a to be in parallel to the connecting surface 13db and being in contact with the connecting surface 13db to support the connecting surface 13db. That is, the bracket body 201 may be in contact with an outer surface of the step portion 13d to support the side panel 13.

The first wall 201a to the third wall 201c may be integrated into one body, and a cross section obtained by cutting the bracket body 201 configured with the first wall 201a to the third wall 201c into a plane being perpendicular to the up-down direction Z may have a t shape.

The reinforcing bracket 200 may include a third coupling flange 202 extending from a lower end of the bracket body 200 in the side direction, wherein the fourth coupling portion 202a may be formed in the third coupling flange 202. More specifically, the third coupling flange 202 may extend from the lower end of the second wall 202b toward the installation portion 101ba, the fourth coupling portion 202a may be positioned at a location corresponding to the installation portion 101ba, and the third coupling flange 202 may be fixed to the lower flange 101b by an anchor bolt 105 fixed to the installation surface by penetrating the fourth coupling portion 202a and the installation portion 101ba.

The reinforcing bracket 200 may include a fourth coupling flange 203 extending upward from an upper end of the bracket body 201, wherein the fifth coupling portion 203a may be formed in the fourth coupling flange 203. More specifically, the fourth coupling flange 203 may extend from an upper end of the first wall 201a toward the third coupling portion 14d, the fifth coupling portion 203a may be positioned at a location corresponding to the third coupling portion 14d, and the fourth coupling flange 203 may be fixed to the step surface 13db by the coupling member 106 (hereinafter, referred to as a third coupling member) penetrating the fifth coupling portion 203a, the step surface 13da, and the third coupling portion 14d sequentially. The fourth coupling flange 203 may be in contact with the step surface 13da to support an outer surface of the side panel 13.

The reinforcing bracket 200 may include a fifth coupling flange 204 extending from a side end of the bracket body 201 in the side direction, wherein the sixth coupling portion 204a may be formed in the fifth coupling flange 204. More specifically, the fifth coupling flange 204 may extend from one end of the fifth wall 201c toward the first coupling portion 102a, the sixth coupling portion 204a may be positioned at a location corresponding to the first coupling portion 102a, and the fifth coupling flange 204 may be fixed to the flange portion 13c by the first coupling member 107 penetrating the sixth coupling portion 204a, the flange portion 13c, and the first coupling portion 102a sequentially. The fifth coupling flange 204 may be in contact with the outer surface of the flange portion 13c to support the outer surface of the side panel 13, although not limited thereto.

For example, the fifth coupling flange 204 may be omitted as shown in FIG. 12. According to another example, the fifth coupling flange 204 and the third wall 201c may be omitted as shown in FIG. 13.

As such, by providing the reinforcing flange 200, the inner surface of the side panel 13 may be supported by the base panel 14 and the leg frame 100, and the outer surface of the side panel 13 may be supported by the reinforcing flange 200. Therefore, shaking or deformation of the cabinet 10 and/or the leg frame 100 by an external force such as the earthquake may be minimized.

So far, specific embodiments have been shown and described. However, the disclosure is not limited to the above-described embodiments, and various modifications can be made by those skilled in the art without departing from the gist of the technical idea of the disclosure defined by the claims below.

What is claimed is:

1. An outdoor unit of an air conditioner, comprising:
a cabinet including a base panel and a side panel;
a compressor supported by the cabinet;
a heat exchanger supported by the cabinet; and
a leg frame at a lower end of the cabinet to support the cabinet, wherein the leg frame includes:
  a channel including an upper flange coupled to the base panel, a lower flange installable on an installation surface, and a web connecting the upper flange with the lower flange, and
  a first coupling portion fixed to the side panel and positioned on a first side of the channel at an end of the leg frame, and a second coupling portion fixed to the side panel and positioned on a second side, opposite to the first side, of the channel at the end of the leg frame with the channel interposed between the first coupling portion and the second coupling portion, so that a center of gravity of the channel is prevented from moving or the channel is prevented from being deformed by shaking of the side panel.

2. The outdoor unit of the air conditioner of claim 1, wherein the leg frame includes:
a first coupling flange protruding upward from one end of the lower flange, wherein the first coupling portion is formed in the first coupling flange, and
a second coupling flange protruding from a side end of the web in a direction away from the first coupling portion, wherein the second coupling portion is formed in the second coupling flange.

3. The outdoor unit of the air conditioner of claim 2, wherein
the channel extends in a left-right direction, and
the center of gravity of the channel is positioned between the first coupling portion and the second coupling portion in a front-rear direction, as seen in a side direction.

4. The outdoor unit of the air conditioner of claim 3, wherein the center of gravity of the channel is identical to a centroid of a cross section of the channel.

5. The outdoor unit of the air conditioner of claim 4, wherein the centroid of the cross section of the channel is positioned at a higher location than a straight line passing the first coupling portion and the second coupling portion.

6. The outdoor unit of the air conditioner of claim 2, wherein the side panel includes:
a side plate portion, and
a flange portion bent from one end of the side plate portion,
wherein the first coupling portion is fixed to the flange portion, and the second coupling portion is fixed to the side plate portion.

7. The outdoor unit of the air conditioner of claim 6, wherein the first coupling flange faces the flange portion, and the second coupling flange faces the side plate portion.

8. The outdoor unit of the air conditioner of claim 6, wherein the base panel includes a third coupling portion fixed to the side panel.

9. The outdoor unit of the air conditioner of claim 8, wherein the side panel includes a step portion bent from one end of the flange portion, and the third coupling portion is fixed to the step portion.

10. The outdoor unit of the air conditioner of claim 8, wherein the third coupling portion is positioned at a higher location than the first coupling portion and the second coupling portion.

11. The outdoor unit of the air conditioner of claim 10, wherein the center of gravity of the channel is positioned inside a triangle of which apexes are the first coupling portion to the third coupling portion, as seen in a side direction.

12. The outdoor unit of the air conditioner of claim 8, further comprising:
a reinforcing bracket positioned at a lower end of the side panel and supporting the side panel.

13. The outdoor unit of the air conditioner of claim 12, wherein the reinforcing bracket includes:
a bracket body,
  a third coupling flange extending from a lower end of the bracket body in a side direction, wherein a fourth coupling portion fixed to the lower flange is formed in the third coupling flange, and
  a fourth coupling flange extending from an upper end of the bracket body, wherein a fifth coupling portion corresponding to the third coupling portion and fixed to the side panel is formed in the fourth coupling flange.

14. The outdoor unit of the air conditioner of claim 13, wherein
the reinforcing bracket further includes a fifth coupling flange extending from a side end of the bracket body and supporting the flange portion, and
a sixth coupling portion corresponding to the first coupling portion and fixed to the flange portion is formed in the fifth coupling flange.

15. The outdoor unit of the air conditioner of claim 14, wherein an insertion groove in which the reinforcing bracket is inserted is formed in the upper flange.

* * * * *